(12) United States Patent
Selby

(10) Patent No.: US 9,324,131 B1
(45) Date of Patent: Apr. 26, 2016

(54) METHOD AND APPARATUS FOR MOTION ADAPTIVE DEINTERLACING WITH REDUCED ARTIFACTS

(71) Applicant: CRUCIAL IP INC., Vaughan (CA)

(72) Inventor: Steve Selby, Toronto (CA)

(73) Assignee: CRUCIAL IP, INC., Toronto, Ontario (CA)

( * ) Notice: Subject to any disclaimer, the term of this patent is extended or adjusted under 35 U.S.C. 154(b) by 204 days.

(21) Appl. No.: 14/243,864

(22) Filed: Apr. 2, 2014

Related U.S. Application Data

(60) Provisional application No. 61/809,304, filed on Apr. 6, 2013.

(51) Int. Cl.
*G06T 3/40* (2006.01)

(52) U.S. Cl.
CPC .................... *G06T 3/4007* (2013.01)

(58) Field of Classification Search
CPC ....... H04N 5/144; H04N 7/012; H04N 7/014; H04N 9/045
USPC .......... 382/254, 305, 264, 191; 348/452, 451, 348/448
See application file for complete search history.

(56) References Cited

U.S. PATENT DOCUMENTS

| | | | |
|---|---|---|---|
| 4,789,893 A | 12/1988 | Weston | |
| 5,661,525 A | 8/1997 | Kovacevic et al. | |
| 5,793,435 A | 8/1998 | Ward et al. | |
| 5,796,437 A * | 8/1998 | Muraji | H04N 5/145 348/448 |
| 5,936,676 A | 8/1999 | Ledinh et al. | |
| 5,943,099 A | 8/1999 | Kim | |
| 6,266,092 B1 * | 7/2001 | Wang | H04N 5/208 345/441 |
| 6,512,550 B1 * | 1/2003 | de Garrido | H04N 7/014 348/448 |
| 6,630,961 B1 * | 10/2003 | Shin | H04N 7/012 348/448 |
| 6,636,267 B1 * | 10/2003 | Adachi | H04N 7/012 348/448 |
| 6,784,942 B2 * | 8/2004 | Selby | H04N 7/0137 348/441 |
| 7,515,205 B1 * | 4/2009 | Wang | H04N 7/012 348/448 |
| 7,724,304 B2 | 5/2010 | Wredenhagen et al. | |
| 7,978,265 B2 | 7/2011 | Chao | |
| 8,018,530 B2 * | 9/2011 | Lu | H04N 5/144 348/448 |
| 8,059,920 B2 * | 11/2011 | Chao | G06T 3/4007 348/448 |
| 8,462,265 B2 * | 6/2013 | Lu | H04N 5/144 348/448 |
| 8,730,393 B2 * | 5/2014 | Lu | H04N 5/144 348/448 |
| 2007/0280539 A1 * | 12/2007 | Hasegawa | H04N 9/045 382/195 |

* cited by examiner

*Primary Examiner* — Mekonen Bekele

(57) ABSTRACT

A method and apparatus for generating an interpolated pixel at a vertical position half way between lines in a field of a video frame. The method comprises detecting a degree of motion in the vicinity of said interpolated pixel and providing weighting factors based on said degree of motion, and detecting a degree of variation in the vicinity of said interpolated pixel and providing a further weighting factor based on said degree of variation. The method further comprises calculating a high vertical frequency contribution, calculating a low vertical frequency contribution, calculating a weighted high vertical frequency contribution based on said high vertical frequency contribution and said further weighting factor, calculating a total vertical contribution by summing together said low vertical frequency contribution and said weighted high vertical frequency contribution, calculating a temporal contribution, and calculating said interpolated pixel by summing together weighted contributions from said total vertical contribution and said temporal contribution based on said weighting factors.

13 Claims, 14 Drawing Sheets

$P_{NEW} = ALPHA * (INTRA\_FIELD(P_{i,2}, P_{i,3}) + BETA * HIGH\_FREQ(P_{i-1,1}, P_{i-1,2}, P_{i-1,3}, P_{i+1,1}, P_{i+1,2}, P_{i+1,3}))$
$+ (1 - ALPHA) * INTER\_FIELD(P_{i-1,2}, P_{i+1,2})$

METHOD AND APPARATUS FOR MOTION ADAPTIVE DEINTERLACING WITH REDUCED ARTIFACTS

FIELD OF THE INVENTION

The invention pertains to the field of digital video signal processing. More particularly, the invention pertains to a method and apparatus for deinterlacing video fields to progressively scanned video frames.

BACKGROUND OF THE INVENTION

Interlacing has been used since the early days of television as a means of conserving the bandwidth required to transmit a video signal. The NTSC, PAL and SECAM television systems all make use of interlacing whereby odd and even lines comprising a video image are transmitted in separate fields. Even with the advent of high definition television and digital transmission systems, interlacing is still commonly used in order to conserve bandwidth. For instance, 1920×1080i is a commonly used format containing 1080 interlaced lines, each line consisting of 1920 pixels.

Display devices based on cathode ray tube (CRT) technology can display interlaced video without the need for prior conversion since the electron beam can be made to scan the screen in an interlaced fashion which matches the interlacing of the received video signal. Flat panel display devices including LCD, plasma, OLED and other technologies are usually progressively scanned whereby odd and even lines comprising a video image are displayed together. Therefore, an interlaced video source must first be converted to progressive format before being displayed on these types of devices. Furthermore, conversion to progressive format when performed effectively, reduces or eliminates certain artifacts associated with interlacing including line flicker.

Numerous methods have been proposed for converting a video signal from interlaced to progressive format. For example, intra-field interpolation, sometimes referred to as "bob", may be used to generate the missing pixels between the lines of an interlaced field in order to create a complete video frame. In this case, missing pixels are generated by interpolating between the values of the vertical neighbors just above and just below the missing pixel. This simple method is frequently used in low cost display devices such as computer monitors since it does not require the use of DRAM for storing entire fields of video. The method performs reasonably well on moving image portions but poorly on static portions due to loss of vertical resolution. Inter-field interpolation, sometimes referred to as "weave", is another commonly understood method. In this case, the missing pixels between the lines of an interlaced field are generated by interpolating between the values of the temporal neighbors or by simply copying the value of the temporal neighbor just before or just after the missing pixel (zero order interpolation). This method produces an ideal output for static image portions, but results in severe motion artifacts for moving portions due to the merging of video fields sampled at different points in time. Consequently, this method is rarely used except in special circumstances, such as video derived from film with a known cadence.

Motion adaptive format conversion attempts to exploit the best of both of the previously described methods. First, the level of motion in the vicinity of a missing pixel is measured according to various methods which are known to those skilled in the art. It is beyond the scope of this disclosure to describe all the possible methods of motion detection, however, most involve calculating the differences between the values of pixels at corresponding horizontal and vertical positions in successive video fields of the same or opposite parity. In the case where the level of motion is low or zero, indicative of a static image portion, the missing pixel is generated using inter-field interpolation so as to maximize vertical resolution. In the case where the level of motion is high, indicative of a moving image portion, the missing pixel is generated using intra-field interpolation so as to avoid motion artifacts, albeit at the expense of vertical resolution. Practical realizations of this method typically involve a "soft switch" between the static and motion cases based on the level of motion to help reduce the appearance of scintillation artifacts that may occur at or near the motion threshold.

Despite the use of soft switching as described above, the appearance of scintillation artifacts due to the presence of noise and at the onset of motion remains a major limitation of motion adaptive techniques. Various solutions have been proposed to address this issue including those described in U.S. Pat. No. 6,784,942 (Selby). In one embodiment of the above, vertical-temporal interpolation is used in place of intra-field interpolation corresponding to the case where the level of motion detected is high. The method of vertical-temporal interpolation preserves vertical detail in comparison with purely vertical interpolation by deriving an enhancing high vertical frequency contribution from one or more adjacent fields in addition to the contribution from the current field for which the missing pixel is sought. Furthermore, since the coefficients for the adjacent field contributions sum substantially to zero, severe motion artifacts are generally avoided, particularly for horizontal motion against a flat background. However, artifacts can be produced for vertical motion greater than a certain velocity at which point the high frequency contribution from the adjacent field(s) becomes detrimental rather than enhancing. In addition, even for horizontal motion, artifacts can be produced near the corners of objects or anywhere that a vertical detail moves to overlap a relatively flat area. In a second embodiment of the above reference, the detrimental effect of the high frequency contribution at higher velocities is mitigated by performing purely vertical interpolation at high levels of motion, vertical-temporal interpolation at intermediate levels of motion and purely temporal interpolation in the static case and at very low levels of motion. The problem with this approach is that owing to the method by which motion is usually detected, even motion at a low velocity which might otherwise benefit from the use of vertical-temporal interpolation, may register as a high level of motion instead. This is because the method by which motion is usually detected, which involves looking at the differences between the values of pixels in successive video fields, gives a measure of motion which is not necessarily proportional to actual velocity. Consequently, full transition to purely vertical interpolation associated with the high motion case often occurs for low velocities which defeats the benefit of vertical-temporal interpolation and fails to solve the problem of scintillation artifacts which may occur at or near the motion threshold.

It is an objective of the present invention to provide a method of motion adaptive deinterlacing in which the problem of scintillation artifacts in the presence of low motion is adequately addressed while minimizing artifacts in the high motion case.

SUMMARY OF THE INVENTION

According to the present invention, a method and apparatus for motion adaptive deinterlacing is provided whereby scintillation artifacts frequently associated with the critical transition between the presence and absence of motion are avoided, while artifacts associated with higher motion velocities are simultaneously minimized. An estimate of the level of motion in the vicinity of a missing pixel is generated based in part on the absolute differences between pixels at corresponding horizontal and vertical positions in successive video fields of like parity. A first weighting factor is determined from the estimated level of motion using a transfer function which may be empirically determined, the value of which varies between zero in the case of no motion and unity in the case of motion above a predetermined threshold. A second weighting factor complementary to the first is determined such that the two weighting factors taken together sum to unity. A third weighting factor whose value varies between zero and unity is determined based on a measure of the variation in the vicinity of the missing pixel. The value of the third weighting factor varies between zero where the region of interest is deemed to be flat and unity where the region is deemed to include a certain amount of variation. A high vertical frequency contribution to the missing pixel is determined based on neighboring pixels located solely in one or more fields adjacent to the missing pixel, the coefficients of which sum substantially to zero. The high vertical frequency contribution is subsequently multiplied by the third weighting factor to produce a weighted high vertical frequency contribution. A low vertical frequency contribution to the missing pixel is generated by interpolating between one or more vertical neighbors above and below the missing pixel, but solely within the same field. The low vertical frequency contribution is subsequently added to the weighted high vertical frequency contribution to produce a total vertical contribution. A temporal contribution to the missing pixel is generated by interpolating between one or more temporal neighbors and subsequently multiplied by the second weighting factor to produce a weighted temporal contribution. The total vertical contribution is multiplied by the first weighting factor to produce a weighted total vertical contribution. The weighted temporal contribution is added to the weighted total vertical contribution to produce the final estimate for the missing pixel.

BRIEF DESCRIPTION OF THE DRAWINGS

The present invention will be even more clearly understood with reference to the drawings appended hereto, in which.

DETAILED DESCRIPTION OF THE INVENTION

Figure 1:
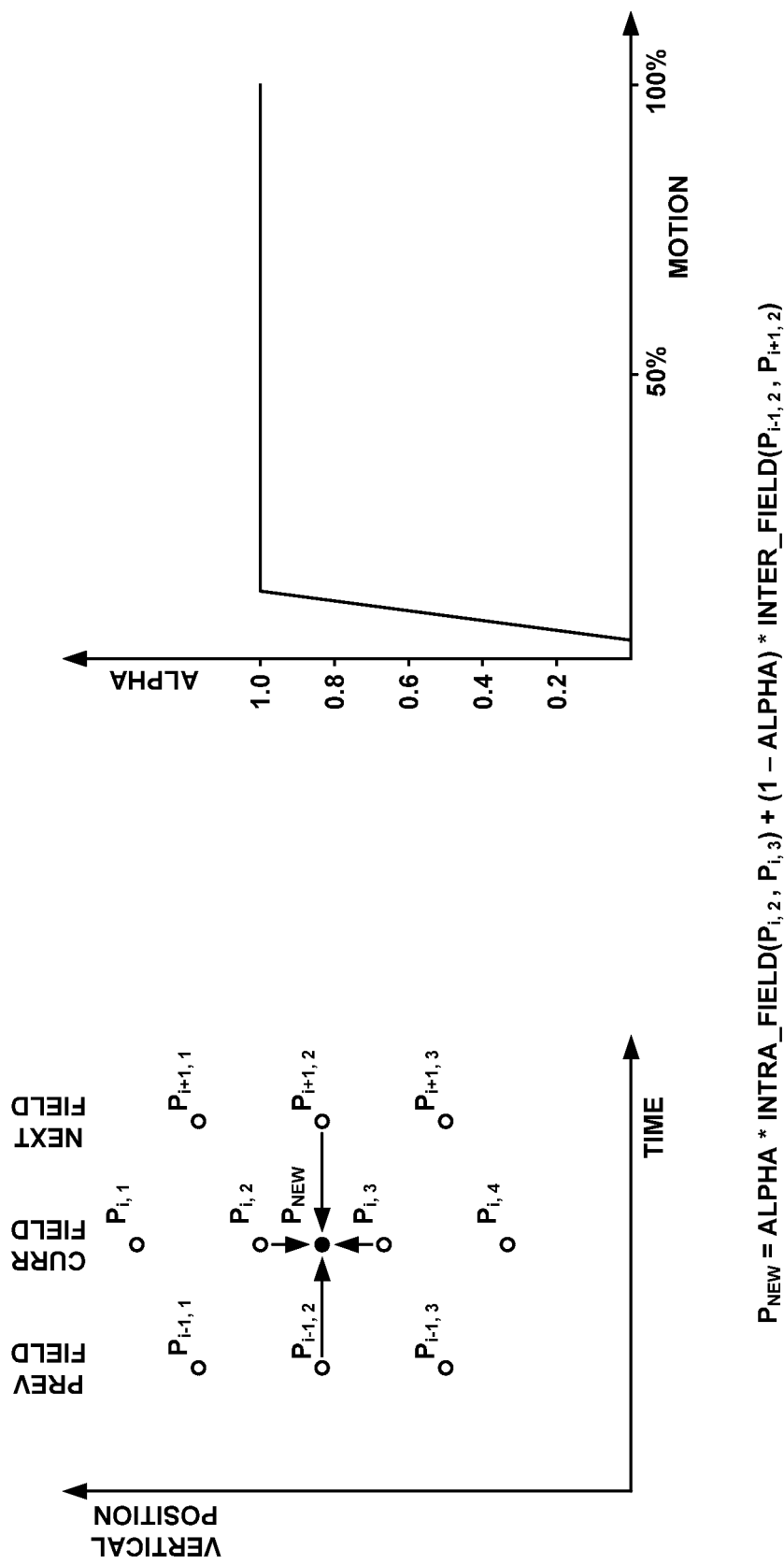
FIG. 1 shows how contributions from the vertical and temporal neighbors of a missing pixel can be combined to provide an estimate of the missing pixel using motion adaptive processing, according to the prior art.

Referring now to FIG. 1, according to the prior art, a missing pixel $P_{NEW}$ can be generated by combining weighted contributions from its vertical and temporal neighbours based on an estimate of the level of motion in the vicinity. First, separate estimates for the value of the missing pixel are generated using both inter-field and intra-field interpolation. The inter-field estimate for $P_{NEW}$ is generated from its temporal neighbors $P_{i-1,\,2}$ and $P_{i+1,\,2}$. While there may be certain advantages to averaging these two pixels in order to reduce noise, a simpler and more common approach is to simply select one of the two pixels in order to reduce the number of fields that need to be retrieved concurrently from memory. This trivial form of interpolation is frequently referred to as zero order interpolation and generally gives acceptable results since the inter-field estimate only weighs heavily in the final result when there is deemed to be no motion and the temporal neighbors are nearly equal in that case. The intra-field estimate for $P_{NEW}$ is generated from its vertical neighbors including at least $P_{i,\,2}$ and $P_{i,\,3}$. Additional vertical neighbors within the same field may also contribute depending on the order of the interpolation method used. In this example, only $P_{i,\,2}$ and $P_{i,\,3}$ contribute and the intra-field estimate is simply the average of these two pixels. The level of motion in the vicinity of the missing pixel is typically detected based on the absolute difference of corresponding pixels in successive video fields of the same parity. The detected motion is mapped to a weight ALPHA which varies between zero and unity based on a transfer function such as that shown in the graph at the right side of FIG. 1. The final estimate for $P_{NEW}$ is calculated as a weighted sum of the inter-field and intra-field estimates where the weights used are 1-ALPHA and ALPHA, respectively. As shown in the graph, there is a steep transition in the value of ALPHA corresponding to a rapid change from the static case to the motion case for relatively small levels of motion. This characteristic is necessary since the use of inter-field interpolation in the presence of even moderate levels of motion would otherwise result in severe motion artifacts. The steepness of the transition, however, means that noise or small changes in the level of motion detected can result in large changes in the value of ALPHA.

Since the inter-field and intra-field estimates for $P_{NEW}$ can differ widely, particularly in the presence of vertical detail, the final value of $P_{NEW}$ will change widely in accordance with the changes in ALPHA and scintillation artifacts will result.

Figure 2:
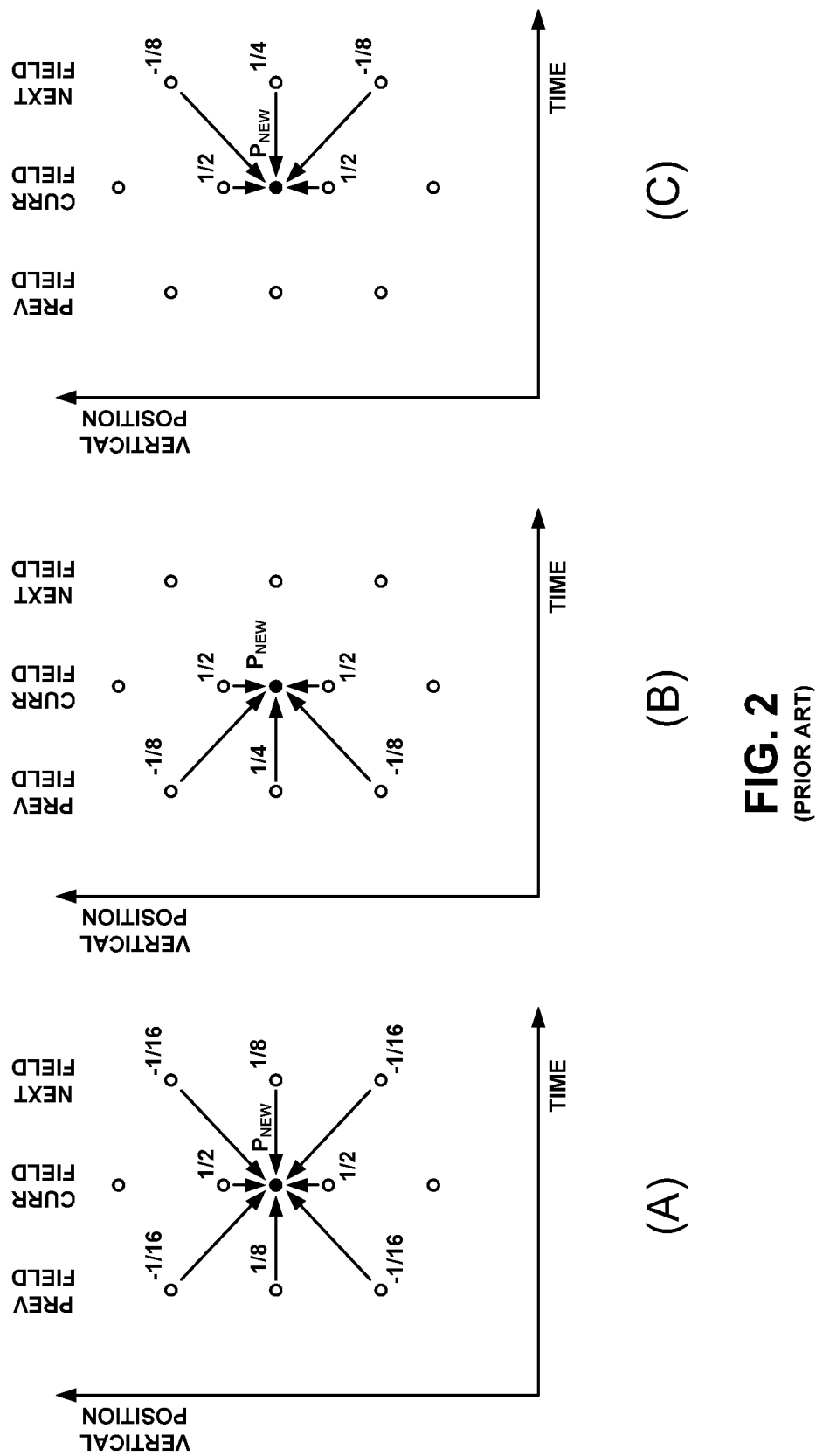
FIG. 2 shows three different methods by which vertical-temporal filtering may be performed, according to the prior art.

Referring now to FIG. 2, three examples are shown of how a missing pixel may be generated using vertical-temporal interpolation, according to the prior art. FIG. 2A shows how the missing pixel $P_{NEW}$ can be calculated as the weighted sum of neighboring pixels from three separate fields, including the current field for which the pixel is sought as well as the previous and next fields. The weighting coefficients for the current field sum to unity, such that a low frequency contribution to $P_{NEW}$ is derived. The weighting coefficients for each of the other fields sum to zero, such that high frequency contributions to $P_{NEW}$ are thereby derived. When the velocity of motion in the vicinity of $P_{NEW}$ is low or where the is no motion at all, the high frequency contributions from the fields adjacent to the current field are enhancing contributions and the resulting value of $P_{NEW}$ is generally a better estimate of its actual value. Furthermore, the result in the case of low velocity motion or no motion will be closer in value to that which would be generated using inter-field interpolation as described above. Consequently, the performance of the method of FIG. 1 can be enhanced in this case by replacing the step of intra-field interpolation with vertical-temporal interpolation as shown in FIG. 2A. Since vertical-temporal interpolation gives a result which is closer in value to the inter-field result, scintillation artifacts associated with large changes in ALPHA are thereby reduced. Note that the weighting coefficients shown in FIG. 2A which are associated with the previous and next fields were determined empirically to provide a sufficient level of high frequency contribution without resulting in undue artifacts. In order to minimize the number of fields that need to be concurrently retrieved from memory, the enhancing high frequency contribution can be derived from just one of the adjacent fields rather than both. In this case, the coefficients of the adjacent field can be doubled such that the high frequency contribution from the one adjacent field is equal to the total of the two adjacent fields where both are used. FIG. 2B shows an arrangement of weighting factors that may be used involving the current and previous field, while FIG. 2C shows an arrangement of weighting factors involving the current and next field.

Figure 3:
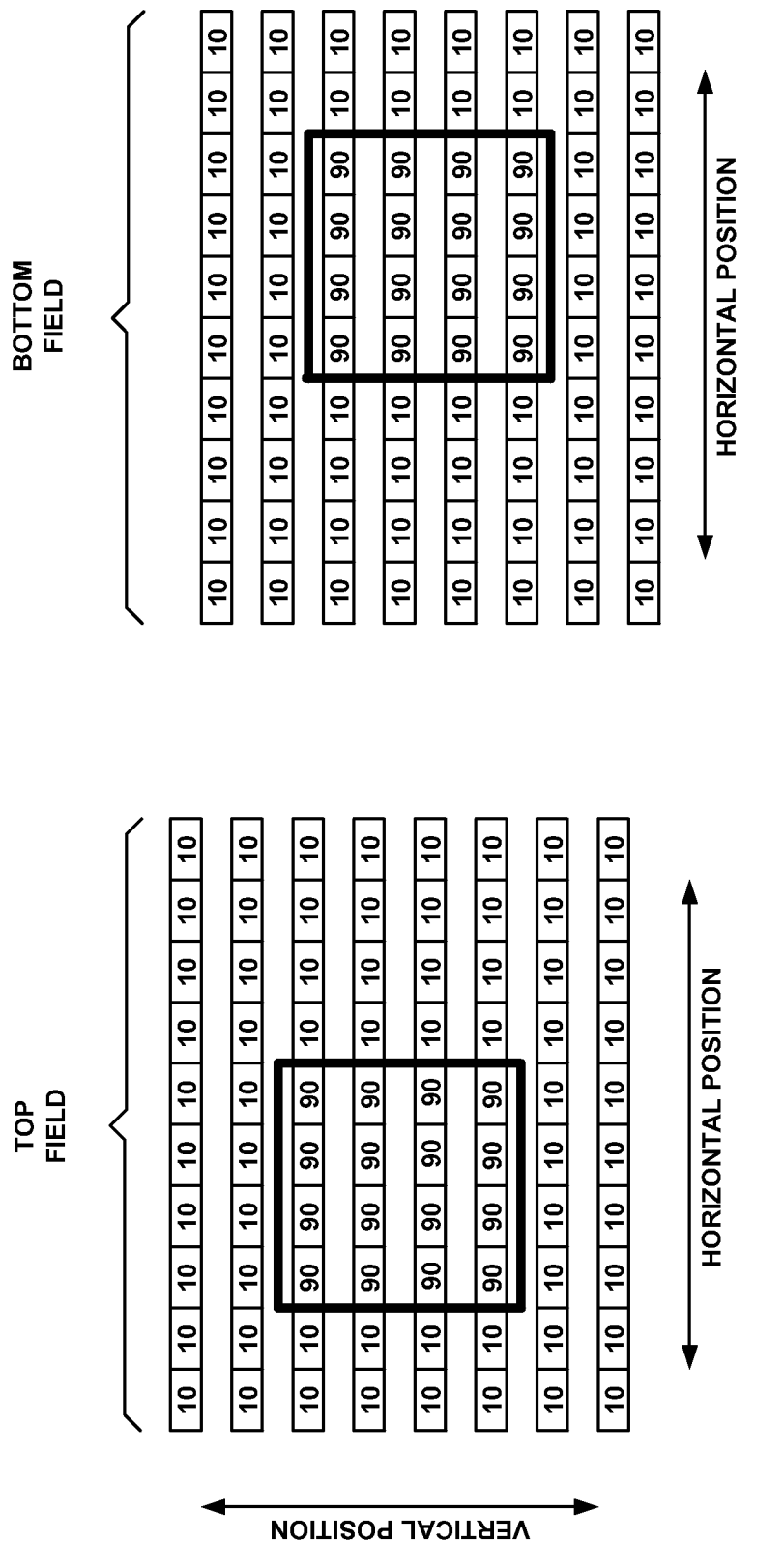
FIG. 3 shows pixel values and relative pixel positions within two successive interlaced video fields representing a light grey rectangle moving from left to right across a dark grey background.
Figure 4:
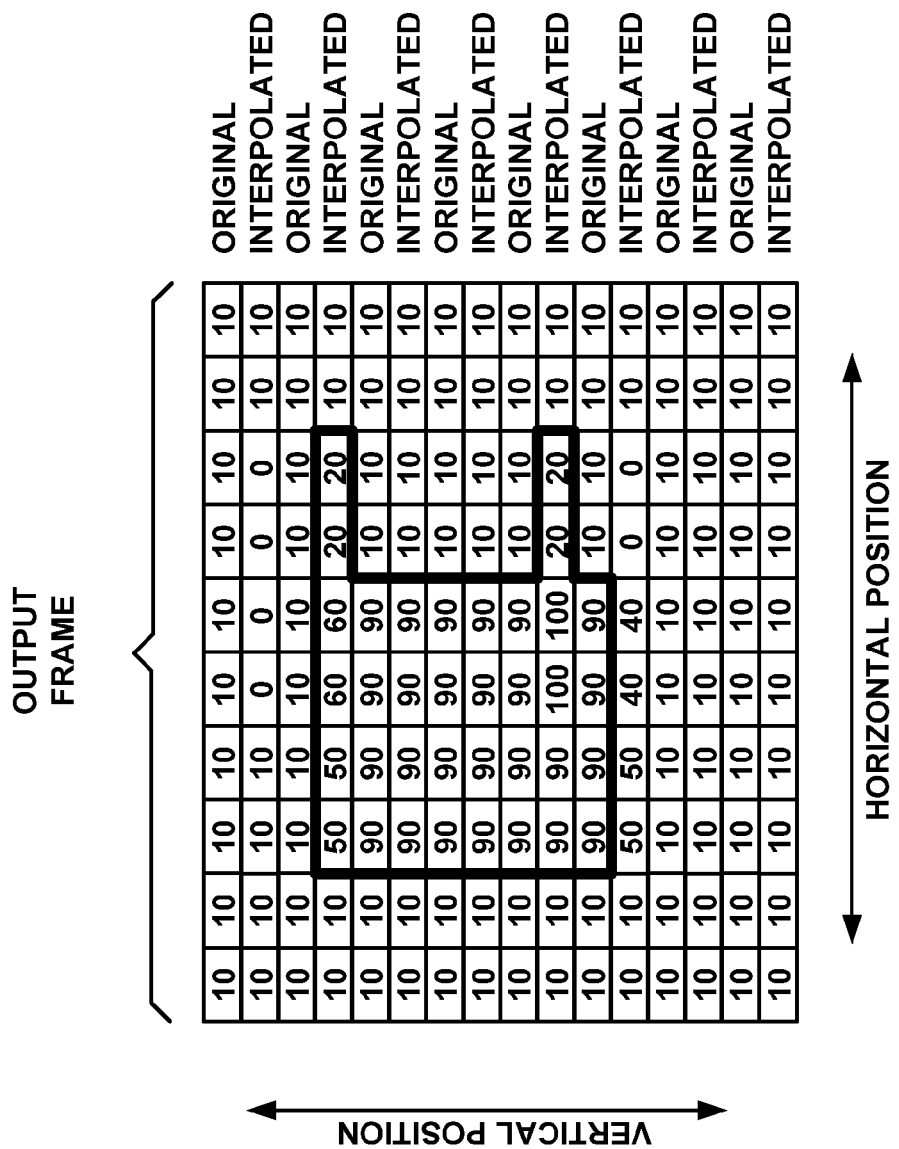
FIG. 4 shows pixel values and relative pixel positions within a progressively scanned video frame which has been deinterlaced using vertical-temporal filtering, according to the prior art.

Turning now to FIG. 3, the pixel values from two successive video fields are shown representing a light grey rectangle moving from left to right across a dark grey background. For simplicity, only the luminance values are shown for each pixel. The matrix at the left represents the pixel values from an interlaced top field while the matrix at the right represents an interlaced bottom field which occurs later in time. The boundary of the rectangle has been highlighted with the use of a bold line in order to emphasize the shape of the object and its movement from one field to the next. Turning now to FIG. 4, the pixel values from a progressive video frame are shown, where the video frame has been generated using vertical-temporal interpolation according to the method shown in FIG. 2C. Those lines in the output frame labeled as ORIGINAL have been copied without modification from the source field labeled TOP, while those lines labeled as INTERPOLATED have been generated using the method of FIG. 2C. Since more than one input pixel contributes to produce each output pixel, there are cases near the top and bottom of the edges of the image where reference is made to source pixels which fall outside of the source image. In this case, the source data is extended by replicating the first and last video lines as required to fill in the missing data. As in FIG. 3, the boundary of the rectangle as perceived by the viewer has been highlighted with the use of a bold line. Note, however, that in the deinterlaced image of FIG. 4, there are artifacts near the upper right and lower right corners of the rectangle. These artifacts are the result of the high vertical frequency contribution derived from the adjacent field. While the adjacent field contribution can have an enhancing effect in the case of no motion or low velocity motion, it has a detrimental effect in this case due to the velocity and direction of the motion. The preceding example makes use of vertical-temporal interpolation only, without the addition of motion adaption. Similar artifacts would have resulted if the method of vertical-temporal interpolation described above had been substituted for the step of intra-field interpolation in the method of motion adaptive processing shown in FIG. 1, since the presence of motion in the region would result in all the weight being applied to the intermediate step of vertical-temporal interpolation and no weight applied to the intermediate step of inter-field interpolation.

Figure 5:
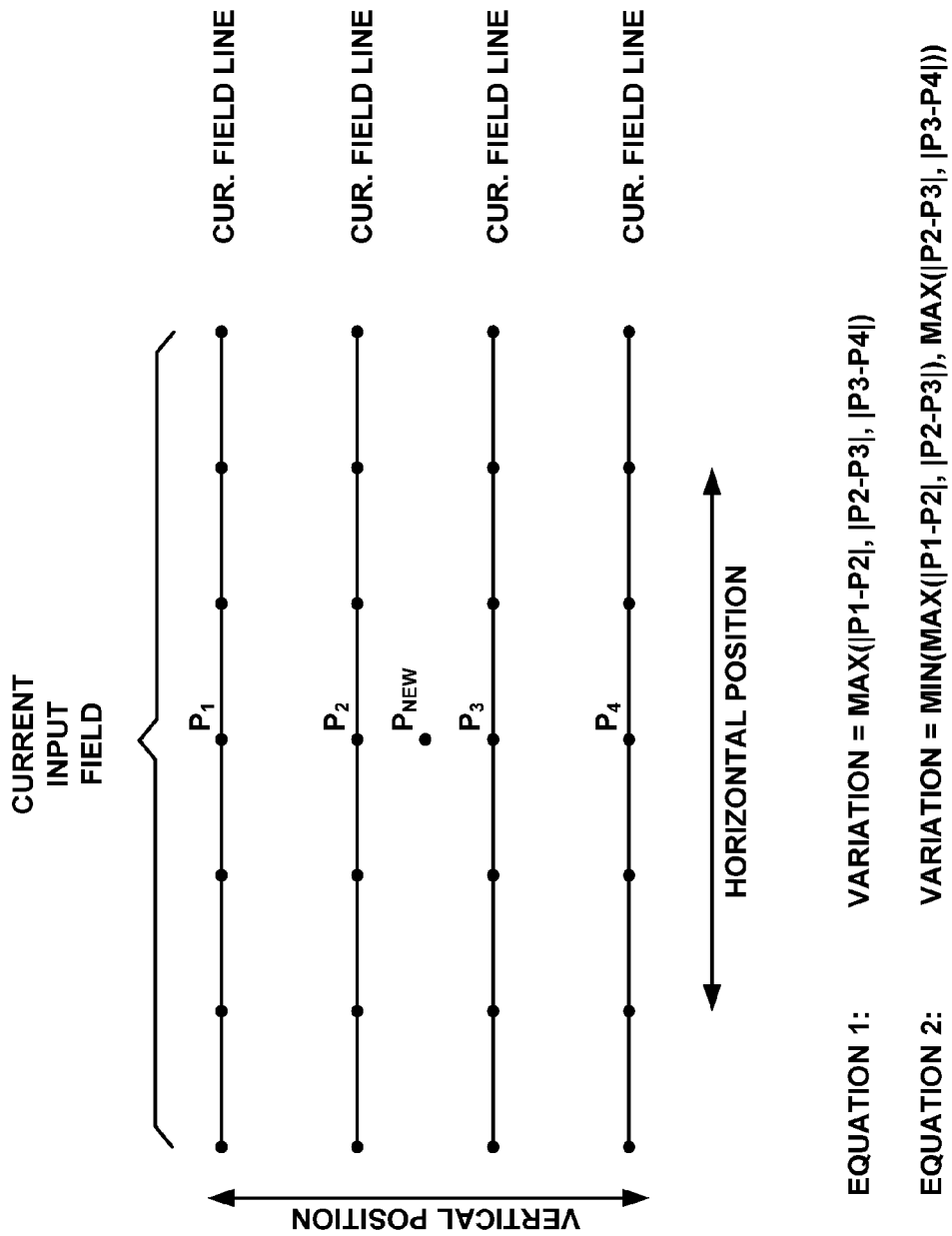
FIG. 5 shows how pixel values in the vicinity of a missing pixel may be used to determine a degree of spatial variation according to embodiments of the present invention.
Figure 6:
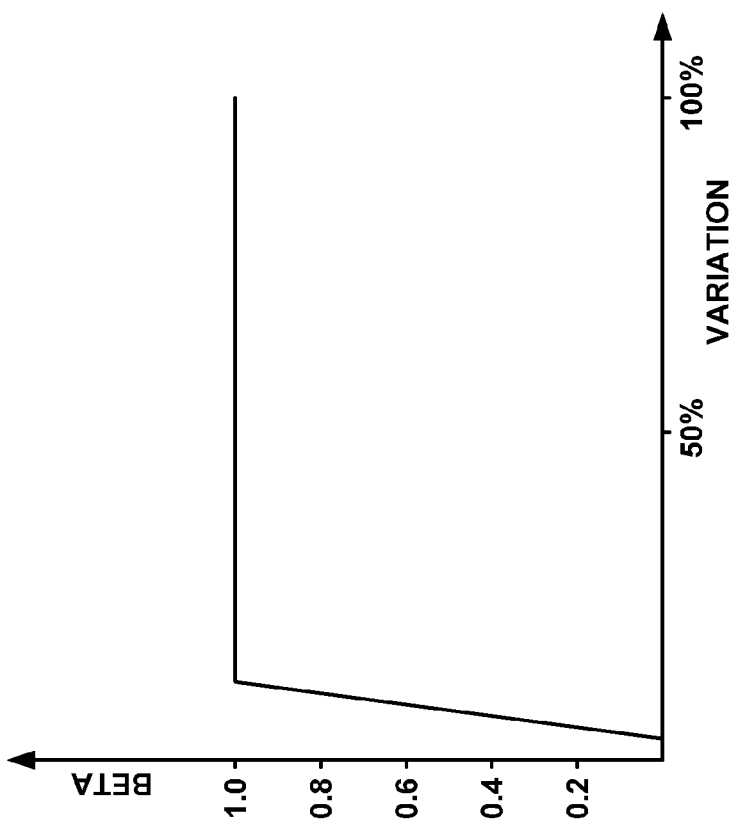
FIG. 6 shows how a missing pixel may be calculated using previously determined levels of motion and spatial variation according to an embodiment of the present invention.

Referring now to FIG. 5, we see how a column of pixels in the vicinity of the missing pixel may be used to calculate a degree of spatial variation in the vertical dimension, according to embodiments of the present invention. Two different equations are shown according to which the variation may be calculated with slightly different results. In either case, the calculated value VARIATION will increase in response to the amount of variation between spatially adjacent pixel values in the region. Turning now to FIG. 6, we see how the level of spatial variation may be used to control the weighting of a high vertical frequency component which is extracted from the fields adjacent to that for which the missing pixel is sought. The graph at the top of FIG. 6 shows how the level of spatial variation is mapped to a weighting coefficient BETA whose value varies between zero and unity. The mapping function is such that the value of BETA is zero for small levels of spatial variation, rises sharply to unity for somewhat larger levels and saturates at unity beyond that point. The equation at the bottom of FIG. 6 shows how the weighting coefficient BETA may be used to control weighting of the high vertical frequency component. The high vertical frequency component may be extracted from the previous and/or next adjacent fields using, for example, the coefficient values associated with those fields as shown in FIG. 2. The weighted high vertical frequency component is subsequently added to the value produced by intra-field interpolation to produce an enhanced estimate of the missing pixel in the presence of slow motion or noise. The final estimate for the value of the missing pixel is produced by taking weighted contributions from the enhanced estimate described above and the estimate produced using inter-field interpolation, where the weights used are the previously described motion weighting values ALPHA and 1-APLHA, respectively.

Figure 7:
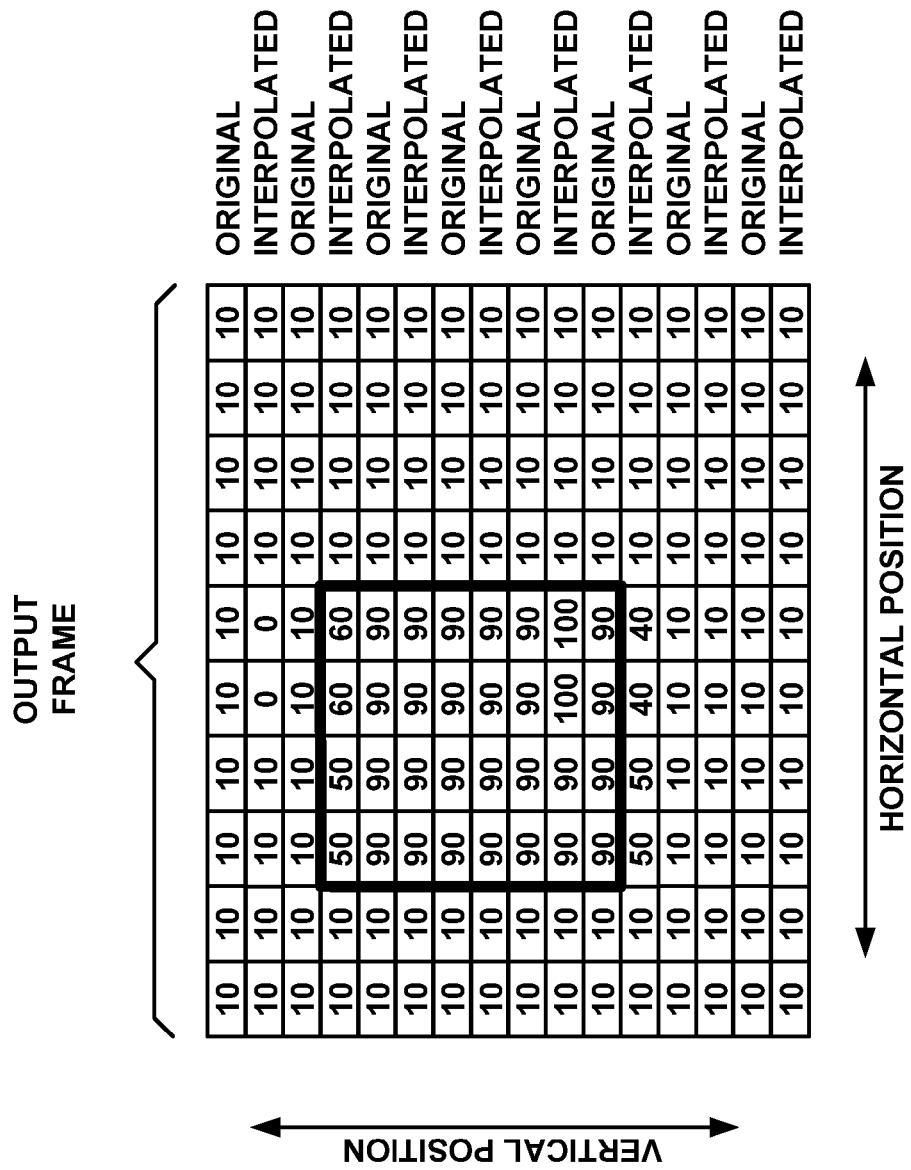
FIG. 7 shows pixel values and relative pixel positions within a progressively scanned video frame which has been deinterlaced according to an embodiment of the present invention.

Turning now to FIG. 7, we see the deinterlaced output frame which results when the method of FIG. 6 is applied to the test case shown in FIG. 3. Note that as with the deinterlaced output frame shown in FIG. 4, only the result of the intermediate step of producing the enhanced estimate described above is shown, without the subsequent step of taking weighted contributions according to motion weighting values ALPHA and 1-APLHA. Furthermore, the coefficients used for intra-field interpolation correspond to those of the current field in FIG. 2C, while those used to extract the high vertical frequency contribution correspond to those of the next field in FIG. 2C. Inspection of FIG. 7 will show that the artifacts near the upper and lower right hand corners of the rectangle which appeared in FIG. 4 are not present. This is because the lack of spatial variation within the current field in that region resulted in a weight of zero being applied to the high vertical frequency component, thereby avoiding its detrimental effect. Since there was a lack of spatial variation to begin with and therefore nothing to be enhanced, no advantage is lost by applying a weight of zero, while the previously illustrated artifacts are clearly avoided. In other situations where a higher level of spatial variation may exist and where the high vertical frequency component may have an enhancing effect, its weight will be increased in accordance with the mapping function shown in FIG. 6. In this way, the weight of the high vertical frequency component is controlled such that it's given little or no weight in cases where its contribution may be detrimental and normal weight in cases where its contribution may be enhancing. In order to avoid instantaneous step changes in the weighting value for small changes in variation, the mapping function has finite slope throughout its range. While only the result of the intermediate step of producing the enhanced estimate described above is shown in FIG. 7, the benefits described above will be retained when the enhanced estimate is combined with the result of inter-field interpolation according to motion weighting values ALPHA and 1-APLHA, respectively.

Figure 8:
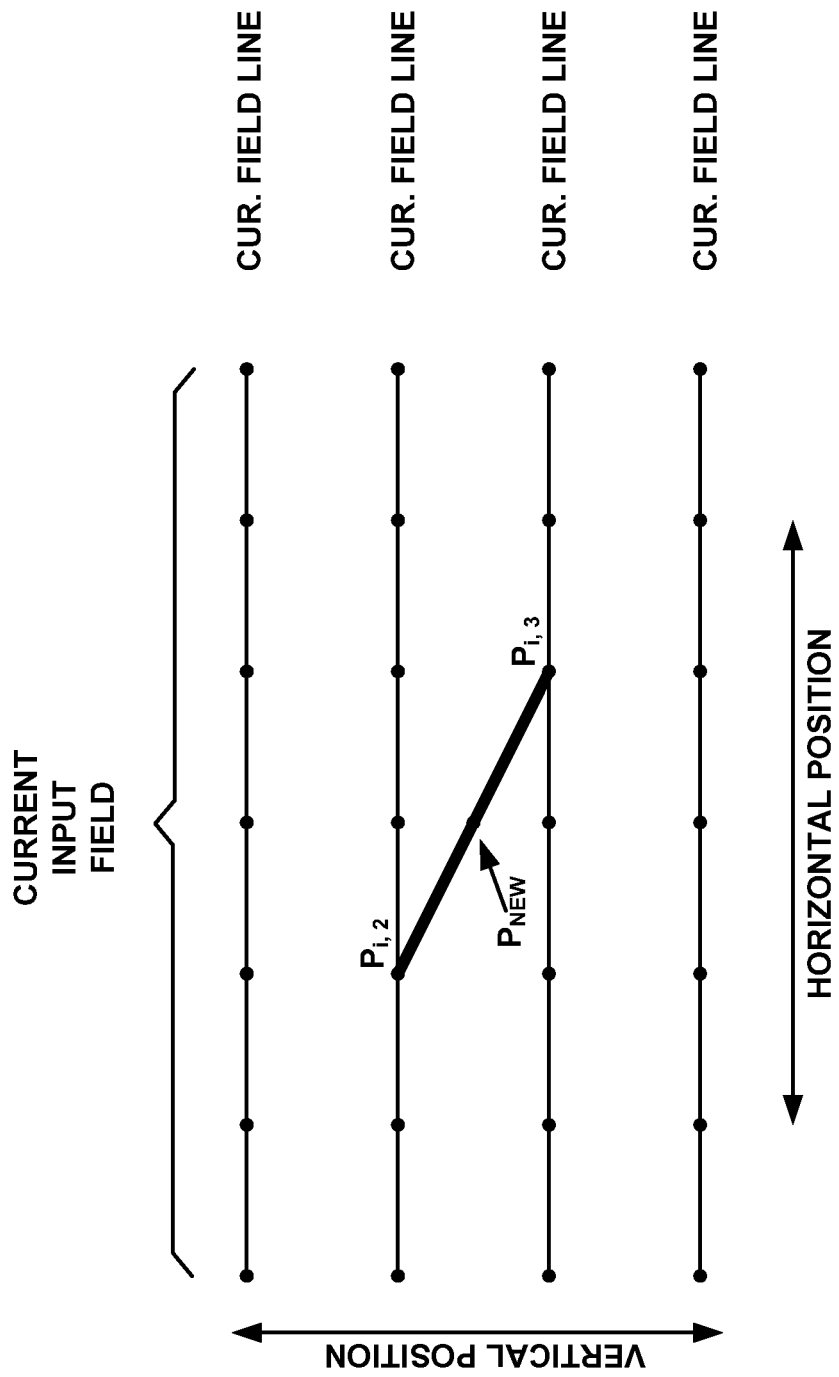
FIG. 8 shows how a missing pixel may be calculated using anisotropic interpolation according to the prior art.

Turning now to FIG. 8, we see how anisotropic or directional intra-field interpolation may be applied to the step of intra-field interpolation, according to the prior art. In the method of FIG. 1, intra-field interpolation is performed using the pixels $P_{i,2}$ and $P_{i,3}$ which are those immediately above and below the missing pixel. Since the same pixels are used regardless of the actual image content, the interpolation is referred to as isotropic. It is well known in the art that certain benefits can be gained by performing interpolation along a line whose direction may vary according to specific image content. In general, it is often advantageous to interpolate in a direction which is parallel to an edge within the image, if such an edge exists and its direction can be determined. This method of interpolation is referred to as anisotropic or directional interpolation and helps to prevent diagonal lines from appearing jagged. A description of the method of edge detection is beyond the scope of this disclosure, however, in the diagram of FIG. 8 it can be assumed that the diagonal line represents a direction which has been determined to be approximately parallel to an edge within the image. With knowledge of the direction, intra-field interpolation can be performed to advantage by interpolating along that direction instead of the default vertical direction as shown in FIG. 1. The pixels $P_{i,2}$ and $P_{i,3}$ shown in FIG. 8 can be thought of as replacing those pixels with the same labels shown in FIG. 1.

Figure 9:
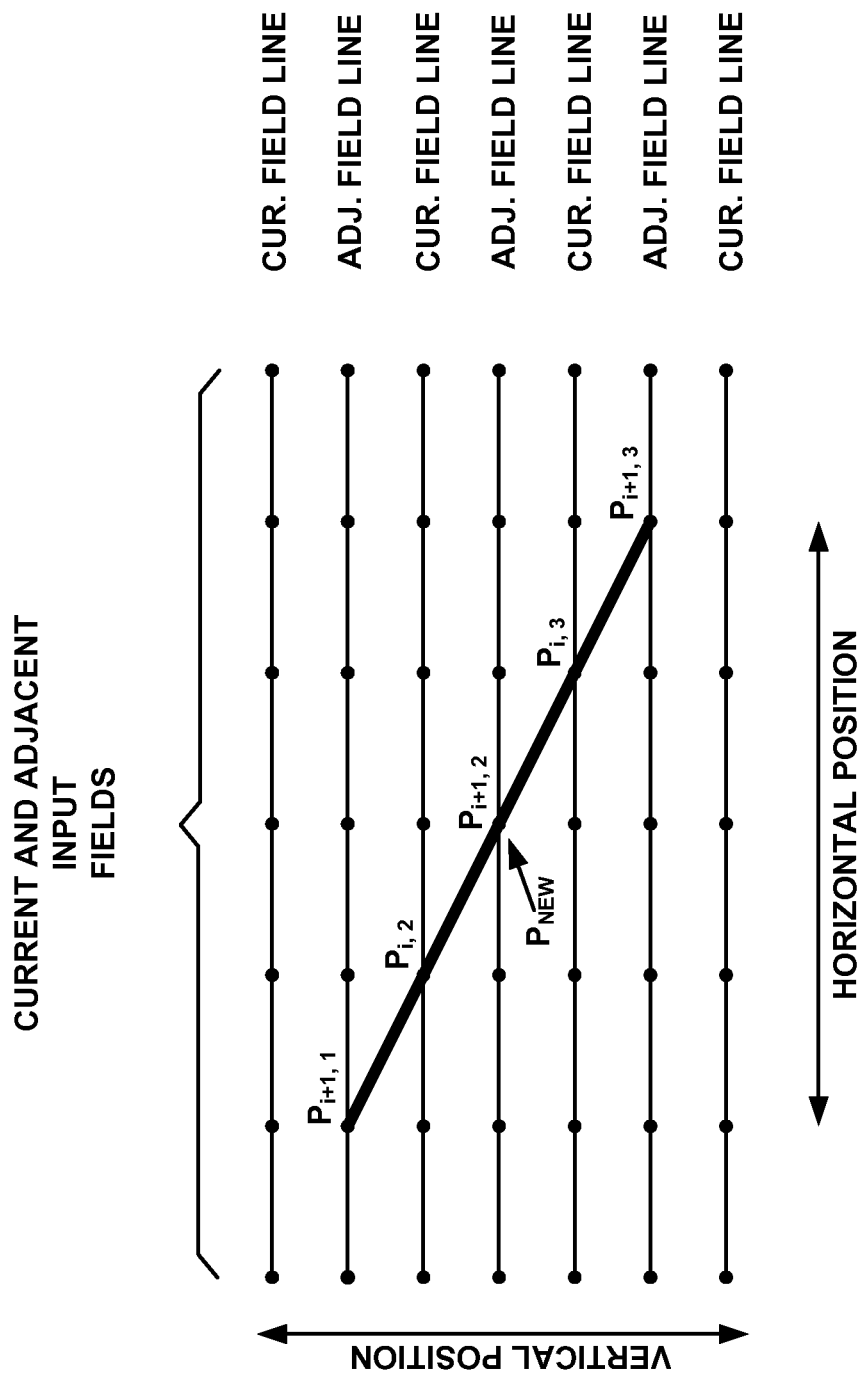
FIG. 9 shows how a missing pixel may be calculated using anisotropic interpolation according to an embodiment of the present invention.

Referring now to FIG. 9, an embodiment of the present invention is shown which allows the use of anisotropic interpolation in order to realize those benefits normally associated with it. As in FIG. 8, the method of edge detection is not shown, but it can be assumed that the diagonal line represents a direction which is approximately parallel to an edge within the image. In this case, the pixel values $P_{i+1,1}$, $P_{i,2}$, $P_{i+1,2}$, $P_{i,3}$ and $P_{i+1,3}$ can be thought of replacing those pixels shown in FIG. 2C and can be used for intra-field interpolation and to produce the enhancing high vertical frequency in the method of FIG. 6. Note that as the line of interpolation is steered according to the method of edge detection (not described), the pixel values used are those which intercept each line. If the direction is detected with sufficient resolution such that the intercept points may fall between the positions of the available source pixels, then the values representing the intercept points may themselves be interpolated using an additional step.

Figure 10:
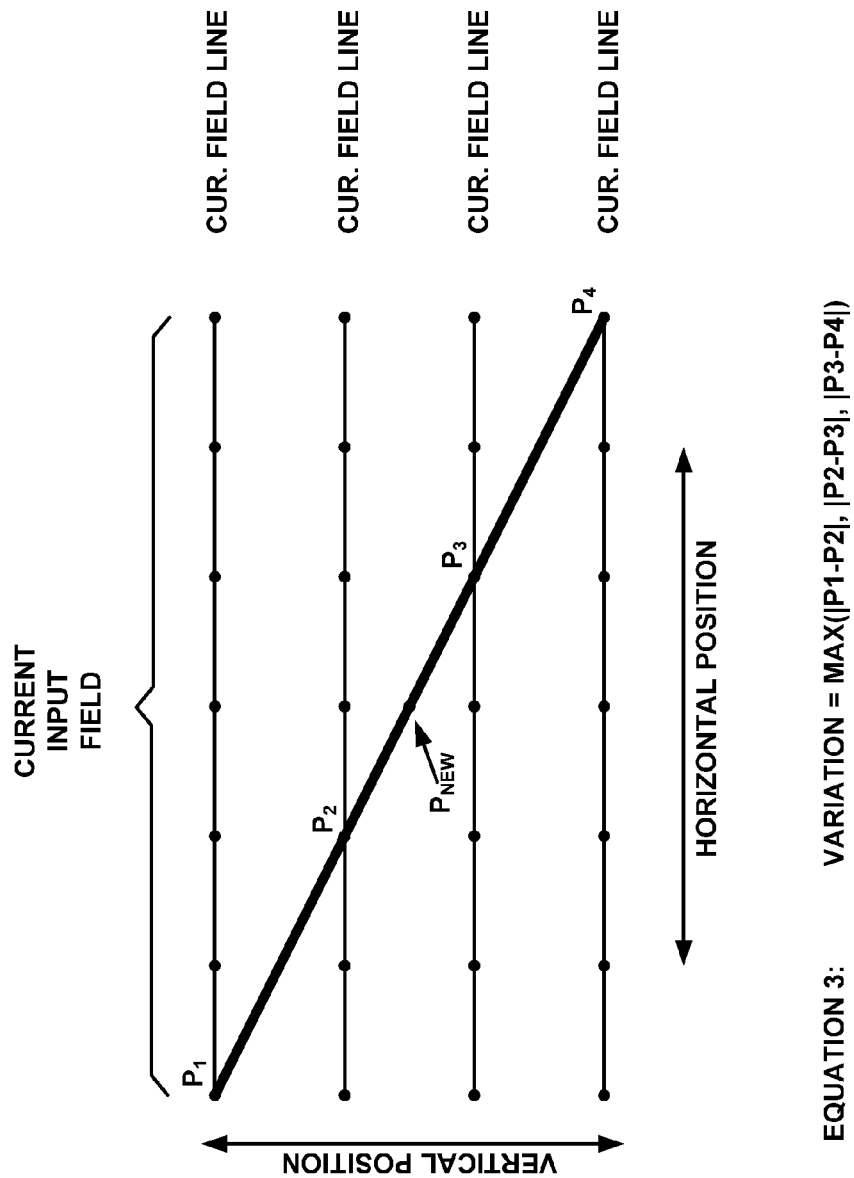
FIG. 10 shows how pixel values in the vicinity of a missing pixel may be used to determine a degree spatial variation according to further embodiments of the present invention.

Referring now to FIG. 10, two additional methods are shown for calculating the level of spatial variation which are useful in conjunction with anisotropic interpolation. Rather than calculating the level of variation along a vertical column of pixels as shown in FIG. 5, the variation can be calculated along the same imaginary line which is used for the purpose of anisotropic interpolation. The advantage to this approach is that there is generally less variation along that line and the detrimental effect of the high vertical frequency contribution in the presence of high velocity motion can thereby be avoided by applying a lower weight consistent with less variation. Equation 3 of FIG. 10 is essentially the same as equation 1 of FIG. 5 except pixels P1, P2, P3 and P4 are taken along the line of interpolation rather than in a vertical column. Equation 4 of FIG. 10 shows an alternate implementation in which only pixels P2 and P3 participate. This implementation is less costly since pixels P1 and P4 which are not otherwise referenced, do not need to be. Pixels P2 and P3 are already available since they are used in the anisotropic interpolation. The smaller detection region associated with equation 4 may result in some performance loss due to lower weighting being applied to the high vertical frequency component in some situations.

Figure 11:
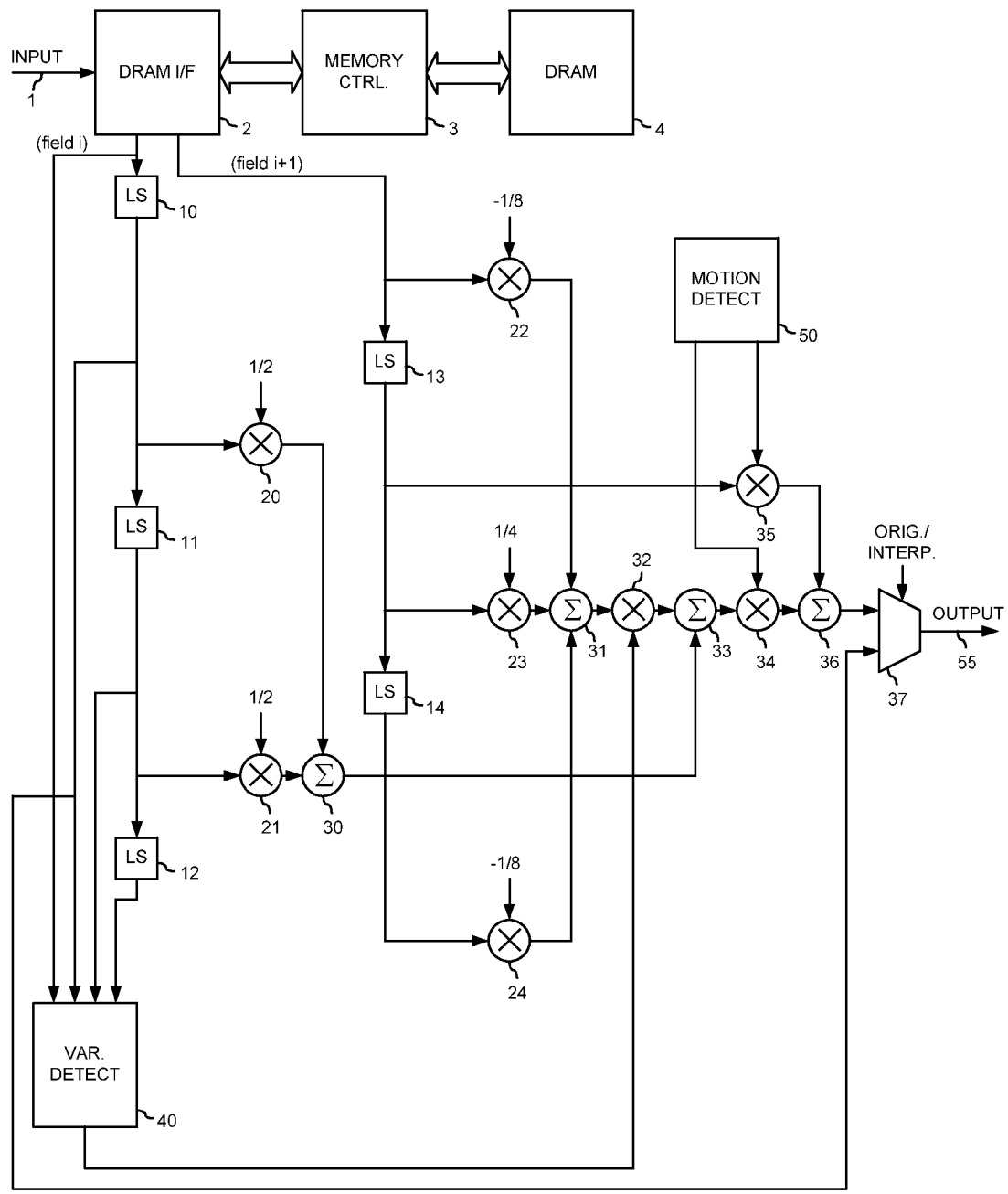
FIG. 11 schematically illustrates an apparatus for generating missing pixels and for passing through original pixels according to an embodiment of the present invention.

FIG. 11 schematically illustrates an example of an apparatus in accordance with an embodiment of the present invention. An interlaced input video signal 1 is presented to the input of DRAM interface 2. DRAM interface 2 in conjunction with memory controller 3, stores the stream of pixels arriving at input 1 into a DRAM array 4. In addition to the storage operation, DRAM interface 2 concurrently retrieves streams of previously stored pixels from a "current" field i and from a "next" field i+1 which is adjacent to field i and occurs later in time. The stream from field i is fed though a cascade of line stores 10-12 while the stream from field i+1 is fed through a second cascade of line stores 13-14. Each line store element has sufficient storage for one line of input video such that the output may be delayed by one line relative to the input. Consequently, at any point in time the field i signal from DRAM interface 2 in conjunction with the outputs of lines stores 10, 11 and 12, represent a column of vertically adjacent input pixels from field i. Similarly, at any point in time the field i+1 signal from DRAM interface 2 in conjunction with the outputs of lines stores 13 and 14, represent a column of vertically adjacent input pixels from field i+1. A special feature of line stores 10-12 and 13-14 allows each line of video to be read out twice before being replaced by the next input line. This feature is useful for interleaving original lines with interpolated lines as required to produce a progressive image and is explained in more detail later.

Still referring to FIG. 11, multipliers 20 and 21 multiply the outputs of line stores 10 and 11 by coefficients which are both equal to ½ in this example. The outputs of multipliers 20 and 21 are then summed together by adder 30 to produce a low vertical frequency contribution derived from field i. Similarly, multipliers 23-24 multiply the field i+1 signal from DRAM interface 2 and the outputs of lines stores 13 and 14, by coefficients −⅛, ¼ and −⅛ respectively. The outputs of multipliers 22-24 are then summed together by adder 31 to produce a high vertical frequency contribution derived from field i+1. Concurrent with the above, variation detector 40 receives as inputs the field i signal from DRAM interface 2 and the outputs of lines stores 10, 11 and 12 representing a column of vertically adjacent input pixels from field i and calculates a degree of variation as detailed in FIG. 12.

Figure 12:
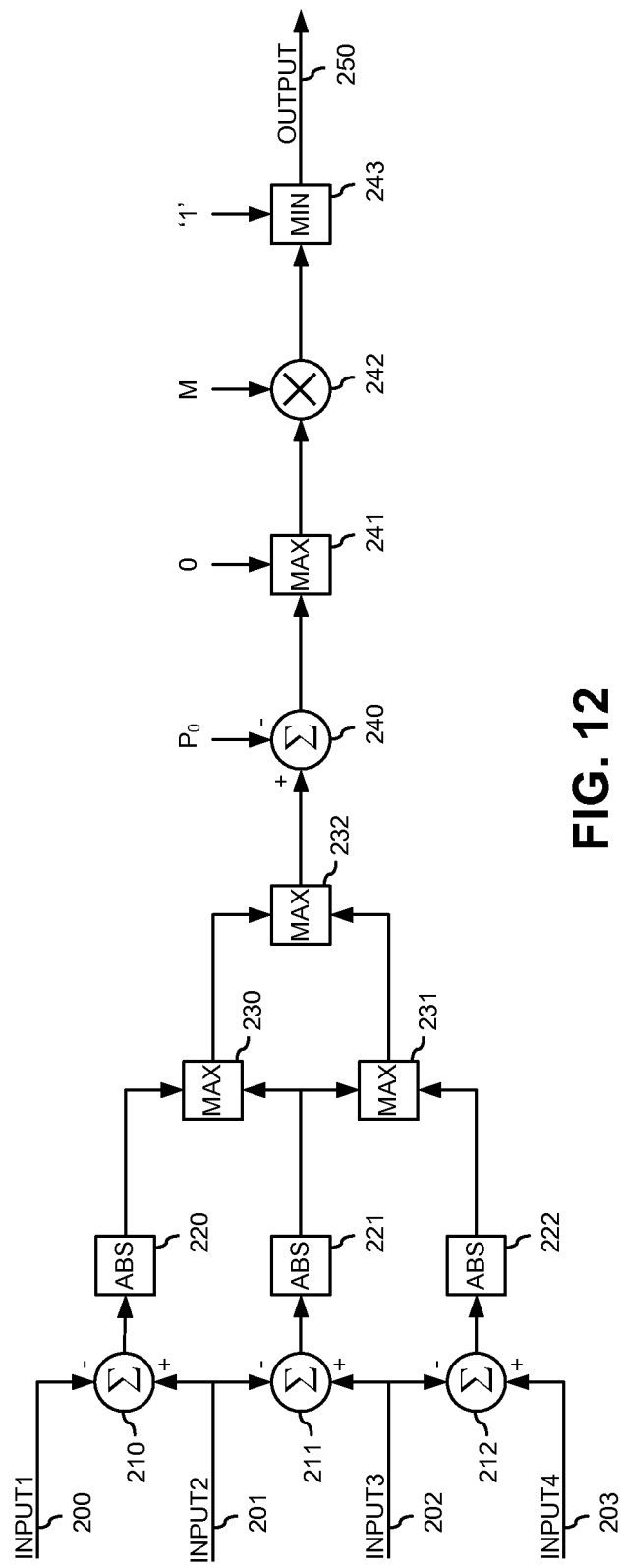
FIG. 12 schematically illustrates an apparatus for calculating a degree of spatial variation according to an embodiment of the present invention.

FIG. 12 illustrates an example of the operation of variation detector 40, in which inputs 200-203 are received representing a column of vertically adjacent pixels. Difference circuits 210-212 calculate differences between pairs of vertically adjacent pixels, the results of which are fed to absolute value circuits 220-222. Maximum value circuits 230-232 are then used to find the maximum value of the three absolute differences. Subsequently, difference circuit 240 subtracts a threshold value $P_0$ from the maximum absolute difference to produce a shifted maximum absolute difference. Maximum value circuit 241 is used to clamp the shifted maximum absolute difference such that its value never becomes negative. Multiplier 242 multiplies the previously clamped signal by a coefficient m representing the slope of a variation mapping function Minimum value circuit 243 is used to clamp the product such that its value never exceeds unity. The clamped value is provided as the output 250 of the variation detector whose value varies between zero and unity.

Returning to FIG. 11, the output of variation detector 40 which is generated as described above with reference to FIG. 12 is applied to multiplier 32 along with the output of adder 31 to produce a weighted high vertical frequency contribution. The weighted high vertical frequency contribution is then added to the low vertical frequency contribution using adder 33 to produce a total vertical contribution. Motion detector 50 uses the differences between inputs from successive fields (not shown) to generate weighting factors indicative of the presence of motion whose values are complementary and sum to unity. Multiplier 34 multiplies the total vertical contribution from the output of adder 33 by a first weighting factor provided by motion detector 50, the value of which varies between a minimum value of zero in the absence of motion and a maximum value of unity in the presence of motion. The output of multiplier 34 represents a weighted total vertical contribution. Multiplier 35 multiplies a temporally adjacent pixel from the output of line store 13 by a second weighting factor provided by motion detector 50, the value of which varies between a maximum value of unity in the absence of motion and a minimum value of zero in the presence of motion. The output of multiplier 35 represents a weighted temporal contribution. Adder 36 adds together the weighted total vertical contribution from multiplier 34 and the weighted temporal contribution from multiplier 35 to produce a final value for the interpolated missing pixel. Multiplexor 37 is used to alternately select on a line-by-line basis either the interpolated output from adder 36 or an original input pixel value from the output of line store 10 in order that interpolated and original lines are correctly interleaved for display.

Figure 13:
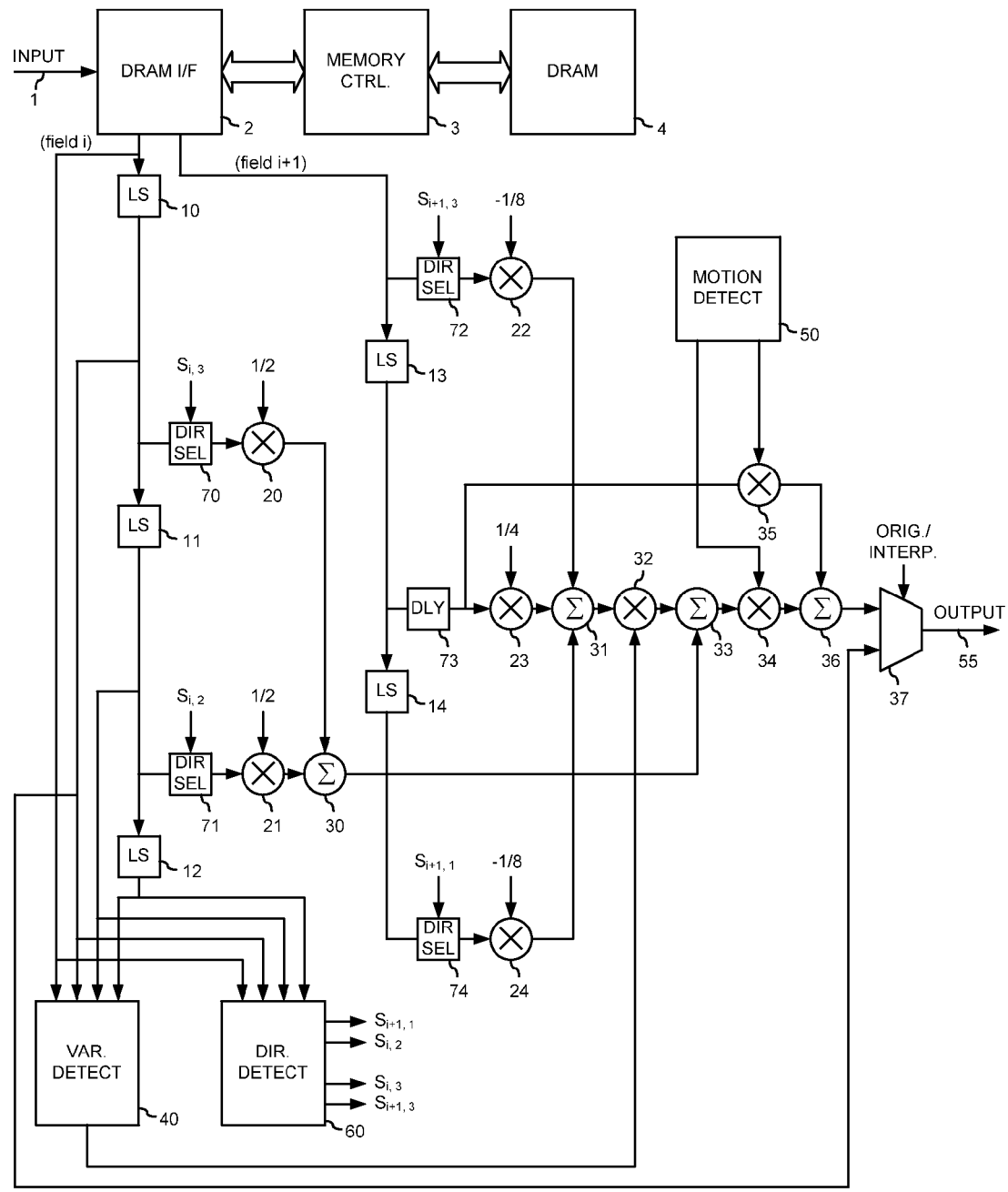
FIG. 13 schematically illustrates an apparatus for generating missing pixels and for passing through original pixels according to another embodiment of the present invention.

FIG. 13 schematically illustrates an apparatus in accordance with another embodiment of the present invention in which the resultant output image is further enhanced through the use of anisotropic (directional) interpolation. The apparatus of FIG. 13 is similar to that of FIG. 11 except for the addition of several new blocks as will now be described. Similarly numbered elements in FIG. 13 correspond to the relevant description above with reference to FIG. 11. Firstly, a directional detector 60 is used to detect the direction of an edge (if any) in the vicinity of the missing pixel and in response to provide signals which control the selection of pixels used for vertical interpolation. Directional detector 60 receives as inputs the field i signal from DRAM interface 2 and the outputs of line stores 10-12 representing 4 vertically adjacent pixels. Directional detector 60 includes pixel delay elements (not shown) which allow it to examine a plurality of pixels within a rectangular window 4 pixels high and at least 9 pixels wide. Based on an analysis of pixel data within this window, directional detector 60 determines a direction along which interpolation may be advantageously performed. Outputs $S_{i+1, 1}$, $S_{i, 2}$, $S_{i, 3}$, and $S_{i+1, 3}$ are selection control signals used to select an intercept point at a specified offset within a window of horizontally adjacent pixels. Selection control signals $S_{i, 2}$ and $S_{i, 3}$ are used to control the selection of intercept points within lines from the "current" field i located just above and just below the missing pixel, respectively. Selection control signals $S_{i+1, 1}$ and $S_{i+1, 3}$ are used to control the selection of intercept points within lines from the "next" field i+1 located above and below the missing pixel, respectively.

Figure 14:
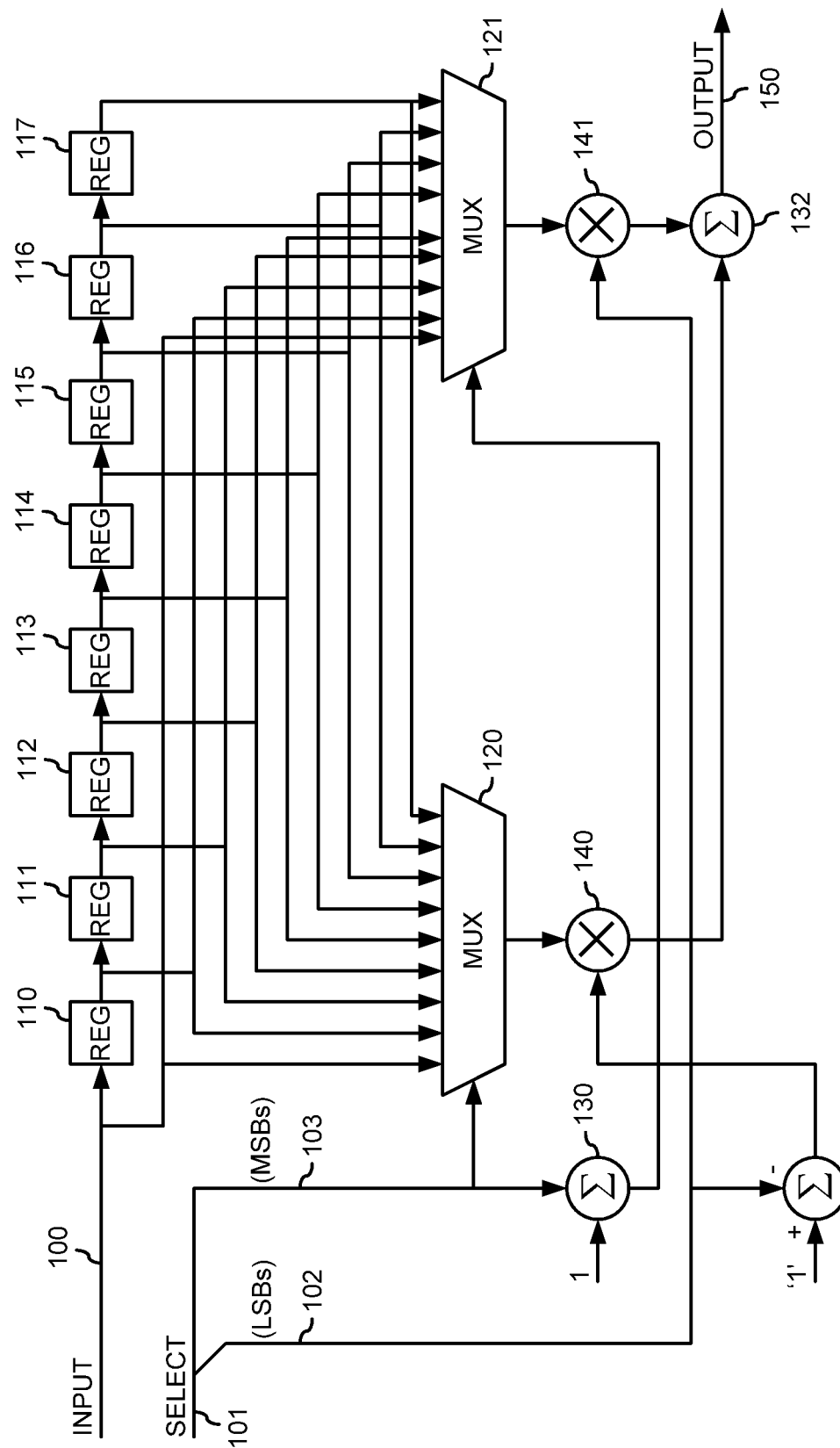
FIG. 14 schematically illustrates an apparatus for determining a pixel value at a horizontal intercept point according to an embodiment of the present invention.

FIG. 14 illustrates an example of how directional selectors 70-72 and 74, as referenced above, are implemented. The directional selector receives at its input 100 a stream of pixel (luminance) values. The input is connected to a cascade of pixel delay elements 100-117, the outputs of which at any given time represent a window of horizontally adjacent pixels. A selection control input bus 101 is comprised of LSBs 102 (least significant bits) and MSBs 103 (most significant bits). The MSBs 103 are used to address a multiplexor 120 such that the nearest pixel to the left of the desired intersection point or coincident with it, is selected. Adder 130 adds 1 to the value of the MSBs 103 and the resulting sum is used to address multiplexor 121 such that the outputs of multiplexor 120 and multiplexor 121 represent horizontally adjacent pixels. Multiplier 141 multiplies the output of multiplexor 121 by the LSBs 102 of selection control input bus 101 to produce a right-side contribution to the output pixel. Difference circuit 131 subtracts the LSBs 102 of selection control input bus 101 from unity to produce a complementary value which is applied to one input of multiplier 140. Multiplier 140 multiplies the output of multiplexor 120 by the complementary value to produce a left-side contribution to the output pixel. Adder 132 adds the left-side contribution from multiplier 140 and the right-side contribution from multiplier 141 to produce an output pixel 150. It should be noted that depending on the desired resolution of the intercept points, it is possible for the LSBs 102 to be omitted, such that output pixel 150 is directly selected from within the available window of input pixels without interpolation. Alternatively, in the case where LSBs 102 are used, the interpolation step could be enhanced by using higher order interpolation involving more than two horizontally adjacent pixels.

Returning to FIG. 13, the inputs to multipliers 20 and 21 representing contributions from the "current" field are taken from the outputs of directional selectors 70 and 71, respectively. Similarly, the inputs to multipliers 22 and 24 representing contributions from the "next" field are taken from the outputs of directional selectors 72 and 74, respectively. The input to multiplier 23 representing the pixel from the "next" field which is coincident with the missing pixel, is taken from the output of delay 73. Delay 73 contains a cascade of pixel delay elements whose total delay is half that contained within directional selectors 70-72 and 74. In this way, contributions from the current and next fields are derived from calculated interception points between a determined line of interpolation and surrounding input lines in the vicinity of the missing pixel. Delay 73 is fixed since the line of interpolation rotates about the missing pixel and so the interception point does not change. It should be noted that while directional detector 60, directional selectors 70-72 and 74 and delay 73 have all been described as containing pixel delay elements, it will be clear to those skilled in the art that the delay elements within directional detector 60 may be shared with those within directional selectors 70-72 and 74 and delay 73 in order to minimize duplication.

Accordingly, it is to be understood that the embodiments of the invention herein described are merely illustrative of the application of the principles of the invention. Reference herein to details of the illustrated embodiments is by way of example and is not intended to limit the scope of the claims, which themselves recite those features regarded as essential to the invention.

What is claimed is:

1. A method for generating an interpolated pixel at a vertical position half way between lines in a field of a video frame, comprising:
   a. receiving at least four pixels vertically adjacent said position in said field and at least three pixels from at least one adjacent field;
   b. detecting a degree of motion in the vicinity of said interpolated pixel and providing weighting factors based on said degree of motion;
   c. detecting a degree of variation in the vicinity of said interpolated pixel and providing a further weighting factor based on said degree of variation;
   d. calculating a high vertical frequency contribution based on weighted contributions from said at least three pixels;
   e. calculating a low vertical frequency contribution based on weighted contributions from at least two pixels of said at least four pixels;
   f. calculating a weighted high vertical frequency contribution based on said high vertical frequency contribution and said further weighting factor;
   g. calculating a total vertical contribution by summing together said low vertical frequency contribution and said weighted high vertical frequency contribution;
   h. calculating a temporal contribution based on at least one of said at least three pixels;
   i. calculating said interpolated pixel by summing together weighted contributions from said total vertical contribution and said temporal contribution based on said weighting factors.

2. The method for generating an interpolated pixel according to claim 1, wherein the step of detecting a degree of variation comprises:
   a. receiving said at least four pixels;
   b. calculating the absolute differences between pairs of adjacent pixels within said at least four pixels;
   c. finding the maximum absolute difference of said absolute differences;
   d. mapping said maximum absolute difference according to a mapping function to provide said further weighting factor, wherein said mapping function increases monotonically from zero to unity.

3. The method for generating an interpolated pixel according to claim 1, wherein the weighting factors used to calculate said weighted contributions from said at least three pixels sum substantially to zero.

4. The method for generating an interpolated pixel according to claim 1, further comprising the step of directional interpolation, wherein said at least two pixels and said at least three pixels are taken as the intercept points between a determined line of interpolation and the lines of input pixels from which said at least two pixels and said at least three pixels are derived.

5. The method for generating an interpolated pixel according to claim 4, wherein said intercept points are calculated by interpolating between pixels within said lines of input pixels.

6. The method for generating an interpolated pixel according to claim 4, wherein the step of detecting a degree of variation is based on the intercept points between said determined line of interpolation and said lines of input pixels.

7. An apparatus for generating an interpolated pixel at a vertical position half way between lines in a field of a video frame, comprising:
   a. memory for receiving at least four pixels vertically adjacent said position in said field and at least three pixels from at least one adjacent field;
   b. a motion detector for detecting a degree of motion in the vicinity of said interpolated pixel and for providing weighting factors based on said degree of motion;
   c. a variation detector for detecting a degree of variation in the vicinity of said interpolated pixel and for providing a further weighting factor based on said degree of variation;
   d. a calculation device for calculating a high vertical frequency contribution based on weighted contributions from said at least three pixels;
   e. a calculation device for calculating a low vertical frequency contribution based on weighted contributions from at least two pixels of said at least four pixels;
   f. a calculation device for calculating a weighted high vertical frequency contribution based on said high vertical frequency contribution and said further weighting factor;
   g. a calculation device for calculating a total vertical contribution by summing together said low vertical frequency contribution and said weighted high vertical frequency contribution;
   h. a calculation device for calculating a temporal contribution based on at least one of said at least three pixels;
   i. a calculation device for calculating said interpolated pixel by summing together weighted contributions from said total vertical contribution and said temporal contribution based on said weighting factors.

8. The apparatus according to claim 7, wherein said memory for receiving said at least four pixels and said at least three pixels comprises a plurality of line stores.

9. The apparatus according to claim 7, wherein said variation detector comprises:
   a. a calculation device for calculating the absolute differences between pairs of vertically adjacent pixels within said at least four pixels;
   b. a maximum value device for finding the maximum value of said absolute differences;
   c. a mapping device for mapping said maximum value to provide said further weighting factor according to a mapping function, wherein said mapping function increases monotonically from zero to unity.

10. The apparatus according to claim 7, further comprising:
    a. a directional detector for determining the preferred direction of a line of interpolation and for determining offset positions representing the locations of intercept points between said line of interpolation and lines of input pixels;
    b. directional selectors for selecting pixels at said offset positions within said lines of input pixels.

11. The apparatus according to claim 10, wherein said directional selectors further comprise interpolators for interpolating between horizontally adjacent pixels when said intercept points lie between pixel positions.

12. The apparatus according to claim 10, wherein said at least two pixels and said at least three pixels are taken as the intercept points between a determined line of interpolation and the lines of input pixels from which said at least two pixels and said at least three pixels are derived.

13. The apparatus according to claim 8, further comprising a memory controller including memory for receiving fields of said video frame and for providing said pixels to said memory.

* * * * *